Patented Apr. 30, 1946

2,399,565

UNITED STATES PATENT OFFICE 2,399,565

DAIRY PRODUCT

Gerald C. North, Evanston, and Alvin J. Alton, Chicago, Ill., assignors to Beatrice Creamery Company, Chicago, Ill., a corporation of Delaware No Drawing. Application July 29, 1942, Serial No. 452,806

1 Claim. (Cl. 99—56)

This invention relates to fat-containing powdered dairy products, e. g., powdered milk, powdered milk-skim milk mixtures, powdered cream, powdered milk-cream mixtures and powdered ice cream mixes having improved miscibility, solubility, flavor and keeping qualities. The invention also comprehends methods for making such products.

Our discovery comprises (1) thoroughly dispersing phosphatides, notably lecithin or lecithin-containing substances in the fluid product to be powdered, and (2) lecithin addition confined to a critical range. This critical range expressed on the basis of the weight of the dried product is from substantially 0.25 to 3.0%.

Only within this critical range will lecithin addition produce desired miscibility and solubility and still result in a product which on reconstitution duplicates the richness and freshness of flavor of the original fluid product and in the case of rehydrated milk is devoid of chalkiness.

We have further discovered that the most effective means for accomplishing such thorough dispersion of the lecithin is to dissolve it separately in fat derived from milk. The fat taken for the purpose of practicing this separate step is part of the amount of fat computed as necessary to attain the desired fat content in a finished product.

We recognize that lecithin has long been known as an anti-oxidant. We further recognize that lecithin has been considered as a wetting agent. However, in spite of such knowledge, lecithin has not come into use in connection with powdered dairy products intended for rehydration nor are all our improved features due to such recognized qualities of lecithin. While we are not committing ourselves solely to this theory, it is our belief that an important function of the lecithin in obtaining our results is to bond the fat so as to prevent the liquid portions of the fat from diffusing into the dry-non-fatty components of the product. When such non-fatty solids are wet, as in the fluid state, they will, of course, repel fat, but as soon as the water is removed by drying, such non-fatty solids are no longer repellent to fat and will tend to absorb the liquid portions of the fat. Such distribution or diffusion of the fat is inimical to best miscibility, solubility and keeping qualities and, therefore, will intefere with rehydration to a fluid having the richness and freshness of flavor of the original fluid product.

The importance of our discovery becomes apparent as we consider the improved qualities of the product in greater detail. In the case of powdered milk, there is always a residue of undissolved material when such a powdered product is reconstituted or rehydrated with water. The reconstituted product tends to produce a sensation on the tongue and against the palate which is unlike that of the original fluid product and which objectionable characteristic has frequently been designated as chalkiness. The product made according to our disclosures reduces the amount of undissolved material on reconstitution to a minimum, and the reconstituted product does not exhibit this defect of chalkiness, but has freshness and richness of flavor of the original fluid product.

In the case of powdered cream with its high fat content in the powdered product, reconstitution with water has always been troublesome. Powdered cream, made according to our disclosure, will go into suspension in cold water with a minimum of stirring. In this respect, the improvement is very striking as compared with powdered cream made by methods now generally known. In this product, also, the completeness of solubility as shown by recognized solubility tests, and the manner in which the fat has been stabilized are such that the reconstituted product has the freshness and richness of flavor like the original fluid product.

A further feature of our discovery is that products made by these methods on being suspended in water do not tend to become foamy to anywhere near the same extent as is the case of products made by conventional methods. This feature, together with the other qualities recited, tends to produce a reconstituted product which more closely resembles the original fluid. More specifically, it can be said that powdered products made by conventional methods when reconstituted are not as homogeneous as their original fluids as is evidenced by the appearance of the film of milk as it drains down the sides of a glass or bottle. Powdered products made in accordance with our disclosure when reconstituted yield a fluid which drains down from the sides of a glass or bottle in a homogeneous film quite like that of the original product.

In carrying out the invention, there is incorporated in the lacteal fluid an amount of lecithin which will give the required critical percentage in the dried product as above stated. By way of example, and in the case of powdered milk, the critical percentage of lecithin found satisfactory is between substantially 0.25 and 2.0% based on the weight of the dried product and in the case of powdered cream, the amount of lecithin found satisfactory is between substantially 0.5 and 3.0% based on the weight of the dried product. This range of substantially 0.25% and 3.0% is applicable to the other dairy products above mentioned.

As explained above, preferably the lecithin or lecithin-containing material is first dissolved in a fat derived from milk, e. g., butter fat, butter oil or milk fat. The lecithin is dispersed in the lacteal fluid in any suitable manner, for instance, by mechanical means such as homogenization and the homogenized mass is then dried in any suitable manner as by spray-drying. The resultant dried fat-containing dairy product will have the lecithin dispersed in the particles in critical amount and, where the fat derived from milk is utilized to incorporate the lecithin, the particles have the lecithin dispersed therein and dissolved in the fat.

We claim:

A powdered cream in which the particles have dispersed therein added lecithin, the added lecithin being present in amount of substantially 0.5 to 3.0% based on the dry weight of the powder, said added lecithin being in addition to lecithin originally contained in the said cream.

GERALD C. NORTH.
ALVIN J. ALTON.